No. 645,347. Patented Mar. 13, 1900.
H. BUCHIGNANI.
PNEUMATIC TIRE.
(Application filed Oct. 10, 1899.)
(No Model.) 2 Sheets—Sheet 1.
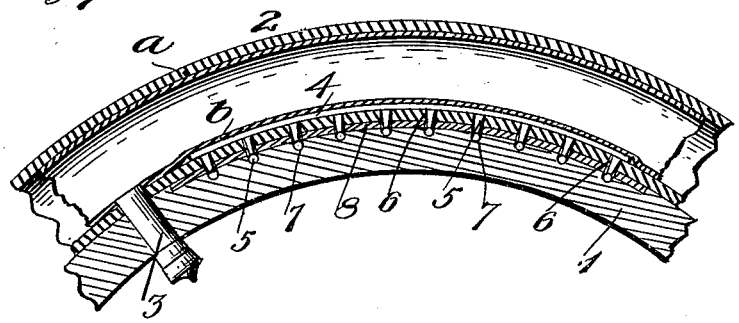
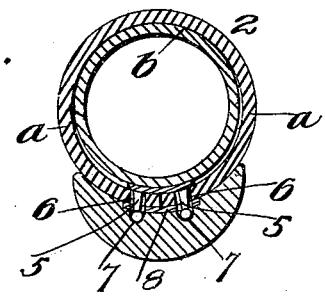
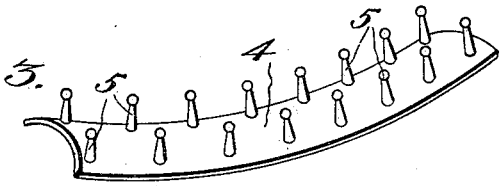

No. 645,347. Patented Mar. 13, 1900.
H. BUCHIGNANI.
PNEUMATIC TIRE.
(Application filed Oct. 10, 1899.)
(No Model.) 2 Sheets—Sheet 2.
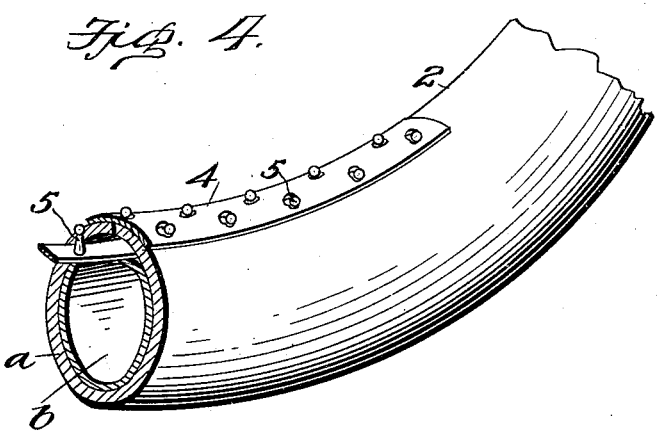
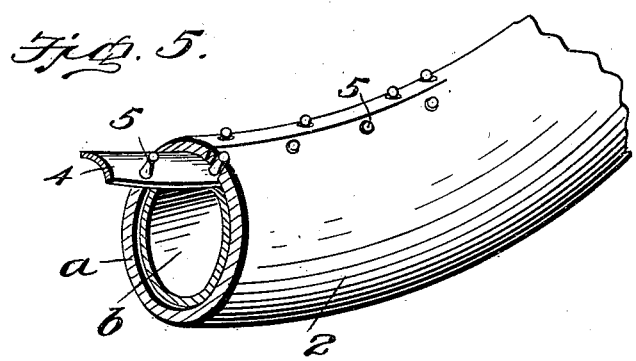

UNITED STATES PATENT OFFICE.

HANNIBAL BUCHIGNANI, OF LEXINGTON, KENTUCKY.

PNEUMATIC TIRE.

SPECIFICATION forming part of Letters Patent No. 645,347, dated March 13, 1900.

Application filed October 10, 1899. Serial No. 733,164. (No model.)

*To all whom it may concern:*

Be it known that I, HANNIBAL BUCHIGNANI, a citizen of the United States, residing at Lexington, in the county of Fayette and State of Kentucky, have invented certain new and useful Improvements in Pneumatic Tires; and I do declare the following to be a full, clear, and exact description of the invention, such as will enable others skilled in the art to which it appertains to make and use the same.

The invention relates to pneumatic tires; and the object of the invention is to provide means for fastening the rubber tire at the slit formed in the inner face of the outer cover or casing and to fasten said tire to the rim of the wheel to prevent it "creeping" and cutting or injuring the valve.

To this end the invention consists in certain features of construction and combination of parts, which will be hereinafter fully described and claimed.

In the accompanying drawings, Figure 1 is a longitudinal sectional view of a tire, illustrating the application of my invention. Fig. 2 is a transverse sectional view. Fig. 3 is a detail perspective view of one form of the fastening-plate. Fig. 4 is a detail perspective view of a portion of a tire, illustrating another form of fastening-plate. Fig. 5 is a view of still another form of my invention.

In the drawings the same reference characters indicate the same parts of the invention.

1 denotes the rim of the wheel, and 2 the tire, consisting of the outer tube $a$ and the inner tube $b$. 3 denotes the air-valve extending through said rim, and 4 denotes a plate designed to cover the slit or opening in the outer tube of the tire. This plate is curved in the same arc as the rim and is provided with headed studs 5, that project through eyelets 6, arranged along the sides of the slit. These studs engage sockets 7, formed in the outer periphery of the rim, and thereby prevent the tire from creeping and cutting or injuring the valve.

That the rim may not be weakened by forming the recesses therein I secure to the rim a metallic plate 8, which has holes therein corresponding to the sockets in said rim, and these holes receive the headed studs of the fastening-plate.

In the form of my invention shown in Fig. 4 I have provided two fastening-plates, one being riveted to the inner side of the outer tube and the other to the outer side of the outer tube, and in the form shown in Fig. 5 I have shown but one fastening-plate, it being riveted to the inner side of the outer tube.

From the foregoing description, taken in connection with the accompanying drawings, the construction, operation, and advantages of my invention will be readily apparent without requiring an extended explanation.

The device is simple, may be made at small cost, and is especially well adapted for the purpose for which it is designed, and it will of course be understood that various changes in the form, proportion, and the minor details of construction may be resorted to without departing from the principle or sacrificing any of the advantages of this invention.

Having thus described the invention, what is claimed, and desired to be secured by Letters Patent, is—

The combination with the rim having sockets in its outer periphery; of a plate secured to said rim and having holes registering with said sockets, a tire having a row of apertures along the slit in its outer tube, and a metallic fastening-plate having studs that project through the holes in said tire and into the sockets in said rim, substantially as and for the purpose set forth.

In testimony whereof I have hereunto set my hand in presence of two subscribing witnesses.

HANNIBAL BUCHIGNANI.

Witnesses:
W. R. MILWARD,
JNO. B. MILWARD.